(12) United States Patent
Weyl et al.

(10) Patent No.: US 8,562,070 B2
(45) Date of Patent: Oct. 22, 2013

(54) FRAME OF AN OPENABLE VEHICLE ROOF AND METHOD FOR MOUNTING A FRAME OF AN OPENABLE VEHICLE ROOF

(75) Inventors: Peter Weyl, Stockdorf (DE); Mattias Hirvonen, München (DE)

(73) Assignee: Webasto AG, Stockdorf/Gauting (DE)

( * ) Notice: Subject to any disclaimer, the term of this patent is extended or adjusted under 35 U.S.C. 154(b) by 0 days.

(21) Appl. No.: 13/511,799

(22) PCT Filed: Oct. 5, 2011

(86) PCT No.: PCT/EP2011/067379
§ 371 (c)(1),
(2), (4) Date: Jun. 26, 2012

(87) PCT Pub. No.: WO2012/079799
PCT Pub. Date: Jun. 21, 2012

(65) Prior Publication Data
US 2012/0248827 A1 Oct. 4, 2012

(30) Foreign Application Priority Data
Dec. 15, 2010 (DE) .......................... 10 2010 054 590

(51) Int. Cl.
*B60J 7/00* (2006.01)
(52) U.S. Cl.
USPC ..................................... 296/216.08; 296/213

(58) Field of Classification Search
USPC ................... 296/216.01, 216.06–216.08, 213
See application file for complete search history.

(56) References Cited

U.S. PATENT DOCUMENTS

| 5,104,178 A | * | 4/1992 | Bienert | 296/216.08 |
| 5,902,008 A | * | 5/1999 | Butsuen et al. | 296/213 |
| 6,435,605 B2 | | 8/2002 | Tsuruo et al. | |
| 7,905,542 B2 | * | 3/2011 | Marx et al. | 296/216.08 |
| 2010/0045076 A1 | * | 2/2010 | Sawada | 296/216.04 |

FOREIGN PATENT DOCUMENTS

| DE | 4330582 C1 | 10/1994 |
| EP | 1279537 A1 | 1/2003 |
| WO | 2005021306 A1 | 3/2005 |

* cited by examiner

*Primary Examiner* — Dennis Pedder
(74) *Attorney, Agent, or Firm* — Fitch, Even, Tabin & Flannery, LLP

(57) ABSTRACT

The invention relates to a frame of an openable vehicle roof comprising two frame parts extending to the side of a roof opening, said frame parts being defined in each case by an end piece arranged on the rear end of the frame part. The invention is characterized in that a resiliently mounted stop element is integrally formed on the end piece, said stop element extending in the region between the frame parts. The invention further relates to a corresponding method for mounting a frame of an openable vehicle roof.

16 Claims, 5 Drawing Sheets

Figure 1:
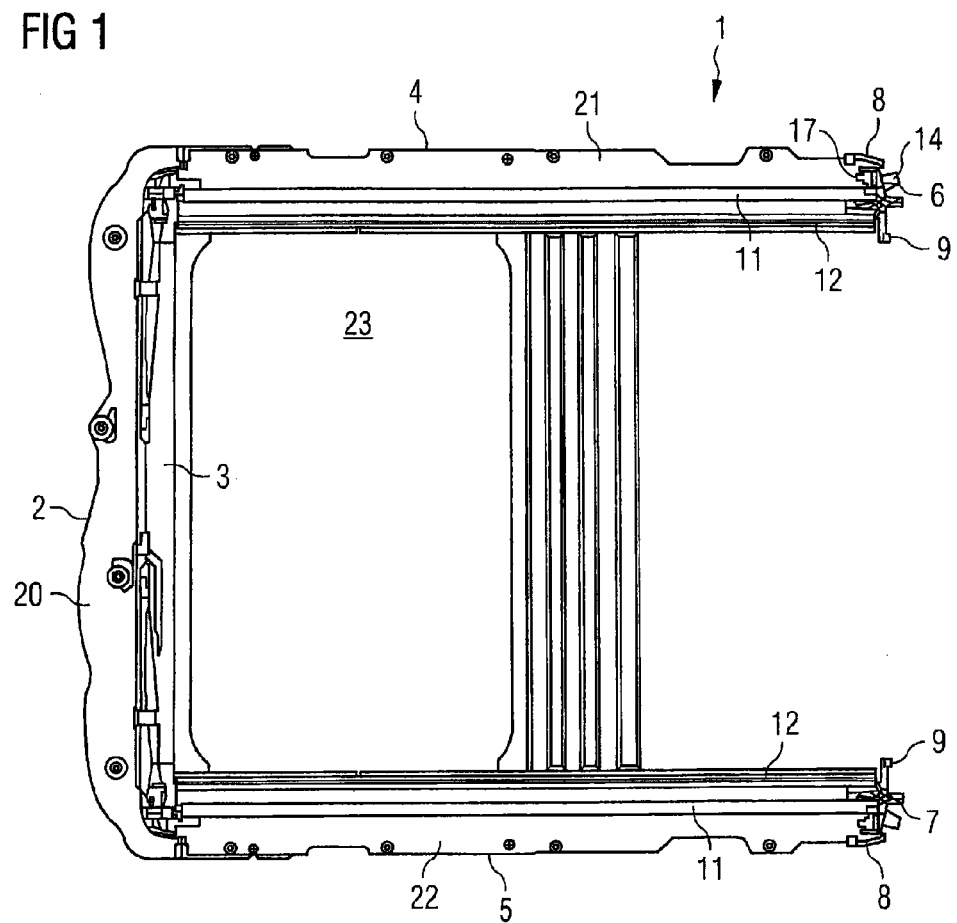

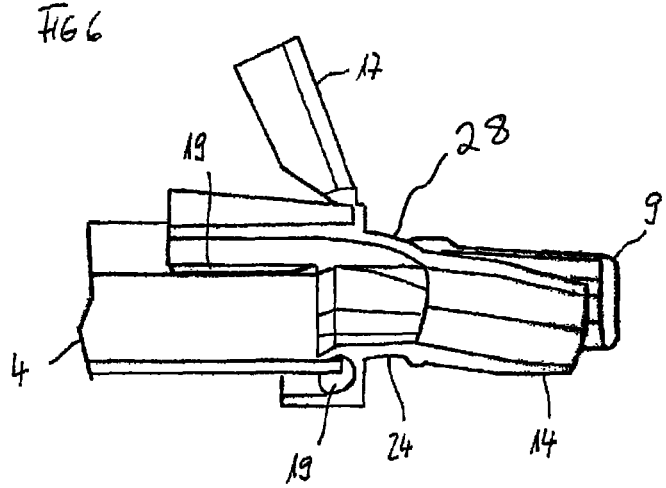
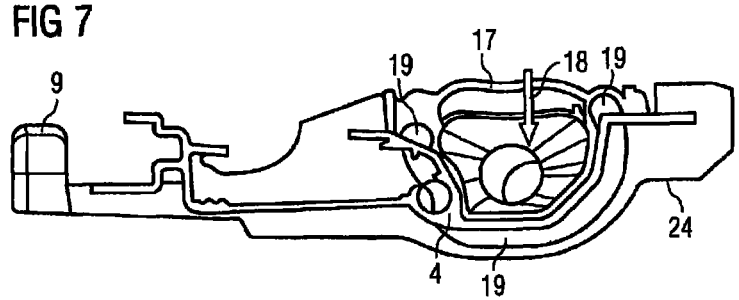

FRAME OF AN OPENABLE VEHICLE ROOF AND METHOD FOR MOUNTING A FRAME OF AN OPENABLE VEHICLE ROOF

CROSS-REFERENCE TO RELATED APPLICATIONS

This application is a U.S. National Stage filing under 35 U.S.C. 371 of International Application No. PCT/EP2011/067379, filed Oct. 5, 2011, designating the United States and claims the benefit of foreign priority from German Patent Application Number 10 2010 054 590.2, filed Dec. 15, 2010, the entire disclosures of which are incorporated herein by reference.

The invention relates to a frame of an openable vehicle roof comprising two frame parts extending to the side of a roof opening, said frame parts being defined in each case by an end piece arranged on the rear end of the frame part. The invention further relates to a method for mounting an end piece on a lateral frame part.

Such a frame is disclosed in DE 4330582 C1. In this case, an end piece configured as a plastics injection-molded part is positioned on the lateral frame part. The end piece comprises a chamber which is provided to receive water which enters the end piece through channels in the lateral frame part. A connecting piece is provided on the end piece for fastening a water drainage pipe.

The water channels are sealed by the end piece, otherwise the frame is open to the rear, in particular for a received sliding roof element.

The object of the invention is to provide a frame of an openable vehicle roof, in which a received sliding roof element is secured against slipping out, as well as a method for mounting such a frame.

This object is achieved by a frame of the aforementioned type which is characterized in that a resiliently mounted stop element is integrally formed on the end piece, said stop element extending in the region between the frame parts.

The stop element according to the invention is provided to secure a sliding element received between the frame parts, in particular a sliding roof, against slipping out of the lateral frame parts. By means of the resilient mounting, it is possible firstly to mount the end pieces and then to insert the sliding roof element. As a result, it is possible to mount the frame fully without knowing what color the sliding roof element is to have. The mounted frames are thus able to be used universally. In particular, in a frame mounted in the vehicle, it is also possible to replace the sliding roof element retrospectively without having to dismantle the frame and/or the frame end pieces.

According to an advantageous development of the invention, in each case the end pieces comprise a base element which is fastened to the lateral frame part, and additionally comprise a cover element which is arranged in a mounted position on a lateral frame part such that a chamber is formed at the rear end of the lateral frame part.

A method according to the invention is provided in the subordinate claim.

A method developed according to the invention for mounting an end piece to a frame side part comprises the additional step: positioning a cover element onto the lateral frame part so that a chamber is formed by the lateral frame part, the base element and the cover element. Said step may be carried out after the end piece has been fastened to the lateral frame part. It is possible for said step to be carried out immediately after positioning the end piece onto a lateral frame part but also at any subsequent time.

By the method developed according to the invention, it is ensured that a sealed chamber is produced and, in particular, a seal integrally formed on the cover element is not damaged by shear forces.

This embodiment of an end piece comprising a cover element could also be implemented without the stop element according to the invention.

In the frame developed according to the invention, therefore, the chamber is not solely formed by the end piece but the chamber is produced by a cooperation of the laterally extending frame part with the cover element of the end piece. As a result, a more compact design may be achieved. Additionally, such an arrangement is more stable as the end piece does not protrude as far over the laterally extending frame part, such that with the inadvertent action of force on the end piece a smaller lever action is present.

In an advantageous development of the invention, the cover element is movably connected to the base element. This may be implemented particularly advantageously by a film hinge. The advantage here is that a seal which is integrally formed on the cover element is not sheared off when the end piece is pushed on, and thus damage to the seal is avoided. After positioning the base element on a frame part, in a further mounting step the cover element is folded down and at the same time pressed with the seals against the frame part. In this position, the cover element is advantageously latched so that a secure fastening is ensured with a good seal relative to the frame part.

In a further advantageous embodiment, the cover element is configured as an additional part which is positioned after mounting the base part in order to form a chamber in combination with the lateral frame part and the base element.

Figure 2:
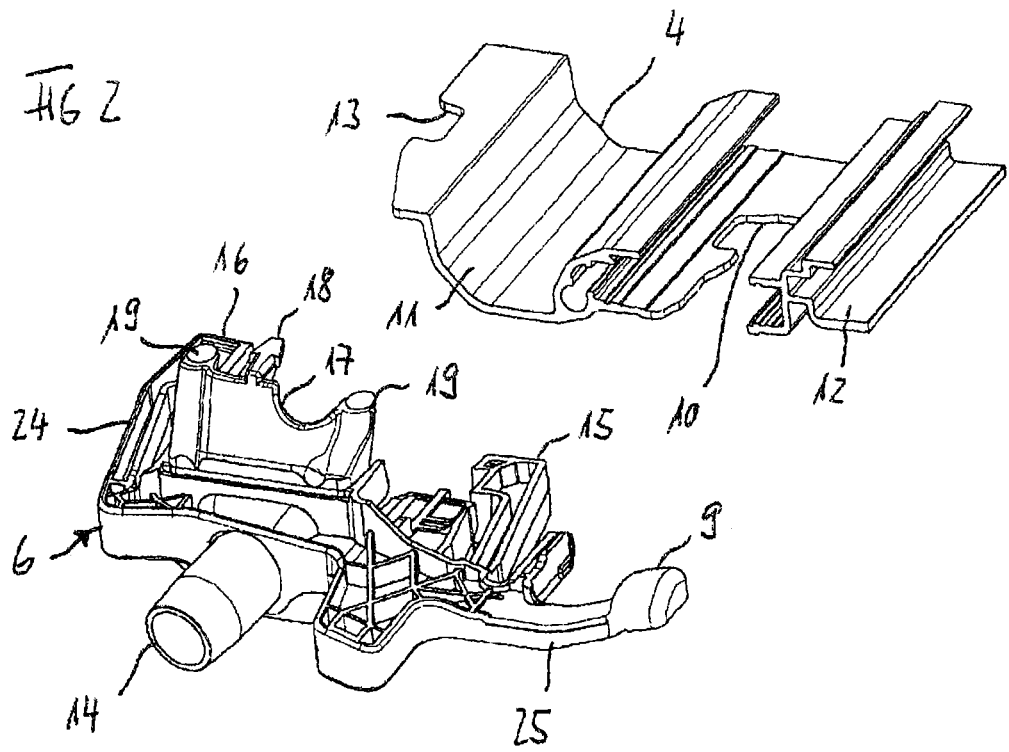
Figure 3:
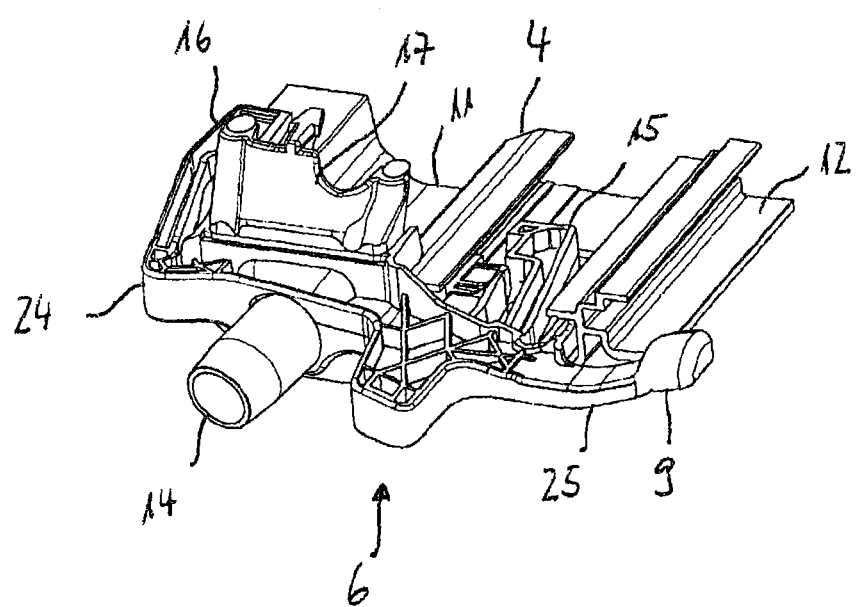
Figure 4:
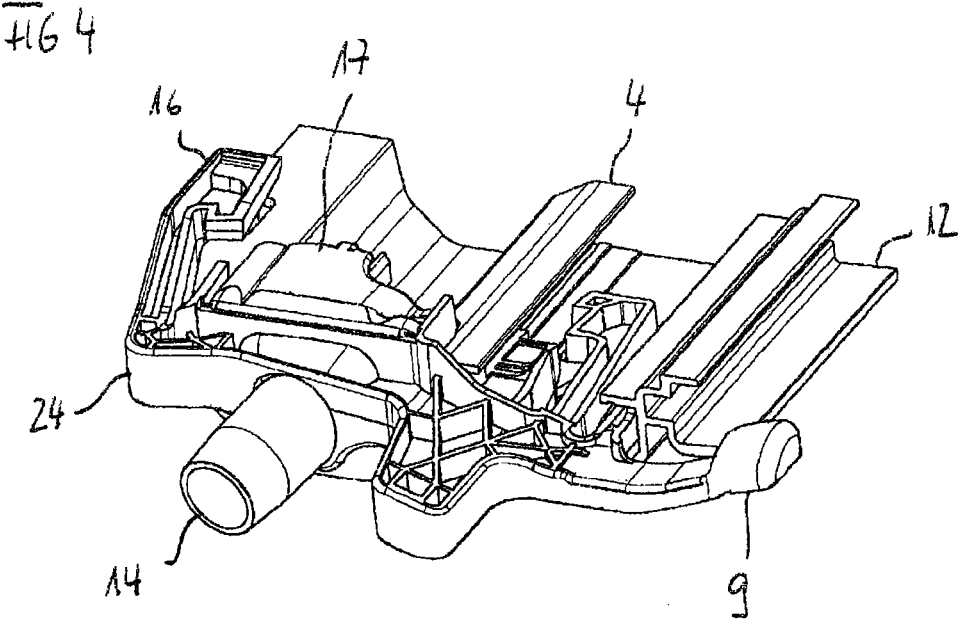
Figure 5:
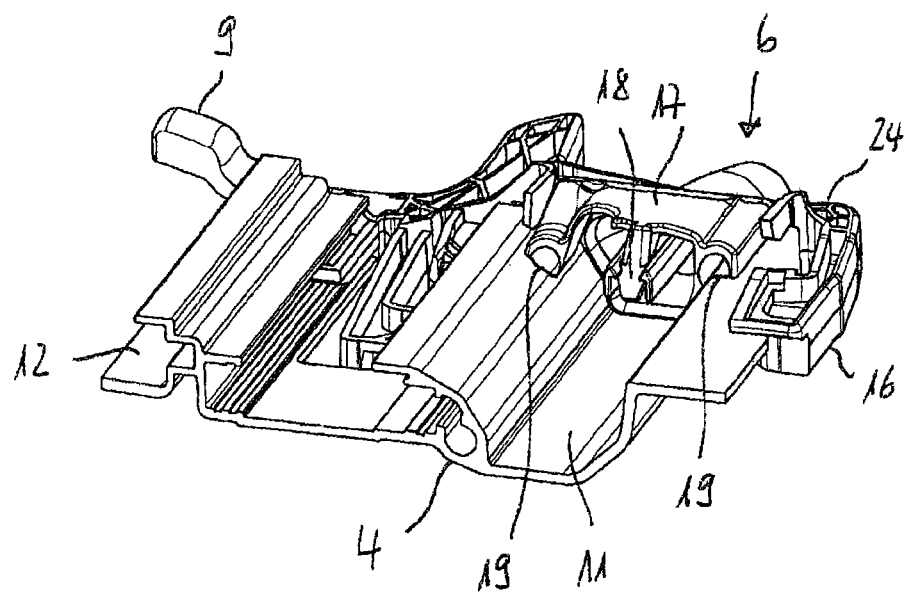
Figure 8:
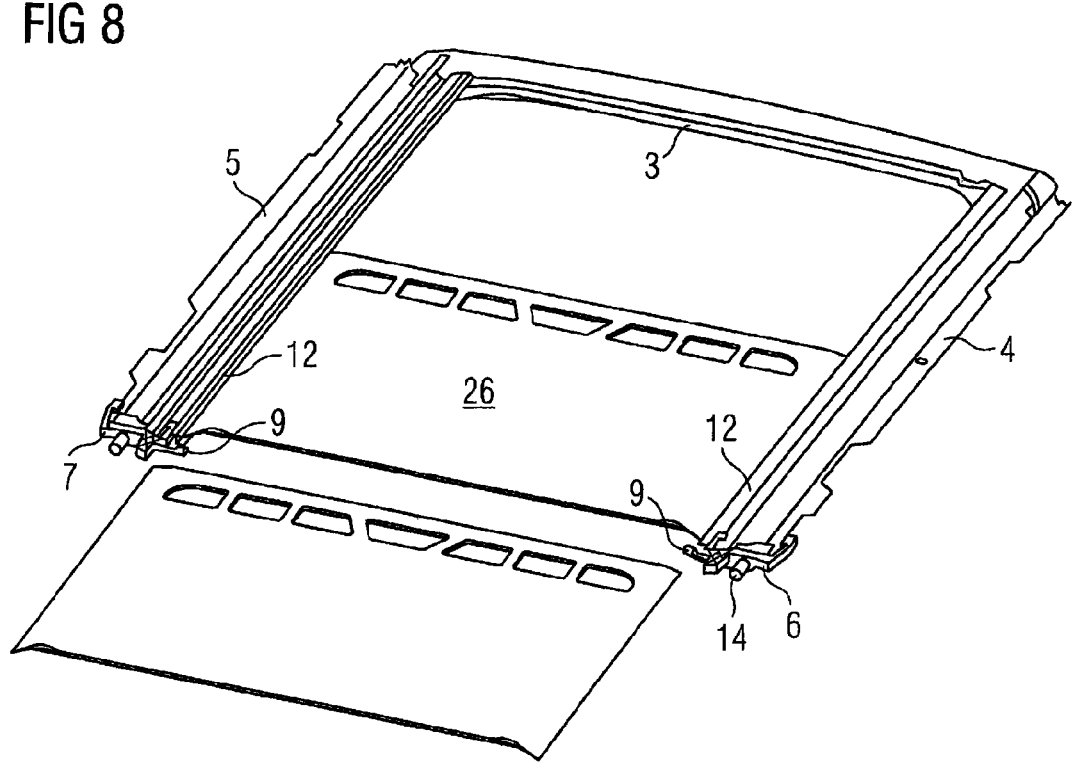

Further advantageous embodiments of the invention are set forth in the sub-claims. The invention is described in more detail hereinafter with reference to an exemplary embodiment, in which:

FIG. 1 shows a frame according to the invention with end pieces mounted on the rear ends of lateral frame parts, FIG. 2 shows a view of the rear region of a lateral frame part as well as an end piece before mounting, FIG. 3 shows a view of the components of FIG. 2 after assembly, FIG. 4 shows the mounted end piece of FIG. 3 after positioning the cover element, FIG. 5 shows the mounted end piece from the viewing direction of the lateral frame part, FIG. 6 shows a detail of the seal arrangement in a sectional view, FIG. 7 shows a further detailed view of the seal arrangement and FIG. 8 shows a perspective view of a frame according to the invention with the received sliding roof element.

A frame 1 of an openable roof is shown in FIG. 1. The frame comprises fastening portions 20, 21 and 22, via which the frame may be fastened to the roof of the vehicle. On the front face 2 of the frame a transversely located first frame part 3 is provided, to which two laterally extending frame parts 4 and 5 are fastened. The lateral frame parts 4 and 5 are sealed at their rear end by end pieces 6 and 7. Said end pieces consist of a plastics injection-molded part and are positioned onto the lateral frame parts. In particular, water channels 11 and guide rails 12 are sealed by the end pieces 6 and 7.

The water channels 11 of the lateral frame parts 4 and 5 serve to conduct water, which penetrates from the top, to the rear and to collect the water at that point in a chamber. The water is discharged from the chamber via pipes which are connected to a connecting piece 14 on each end piece. Due to the discharge of the water, it is necessary for the contact points between the end piece 6 and 7 and the lateral frame parts 4 and 5 to be configured to be watertight. Otherwise, water could run out of the water channels 11 at this point and enter the vehicle interior.

Additionally, stop elements 9 are formed on the end pieces 6 and 7, said stop elements defining the guide rails 12 to the rear. As a result, a movable roof part 23 such as a sliding roof element is prevented from being displaced to the rear and slipping out of the guide rails 12 at that point.

FIG. 2 shows a more detailed view of an end piece 6 and a lateral frame part 4 before the end piece has been positioned on the lateral frame part 4. Recesses 10 and 13 are provided on both sides of the water channel 11, said recesses being configured for cooperation with latching elements 15 and 16 of the end piece 6. When assembled, the latching elements 15 and 16 are engaged in said recesses and thus permit a secure, non-positive connection between the end piece 6 and the lateral frame part 4. Apart from the recess 10 the lateral frame part 4 has a straight edge, which may be implemented easily and cost-effectively.

The end piece 6 is also shown in detail in FIG. 2. The end piece is positioned from the rear onto the lateral frame part 4 and is latched via two snap connections 15 and 16 to the recesses 10 and 13 of the lateral frame part 4. On the side of the end piece 6 facing the frame part 4, suitably shaped surfaces are provided which in the mounted state of the end piece oppose the rear edges of the water channel 11. Seals are provided on said surfaces, which however is not visible in FIG. 2. As a result, in the mounted state the water channel 11 is tightly sealed to the rear. The only remaining opening passes through the connecting piece 14 where a water drainage pipe may be attached.

A cover element 17 is provided in order to seal at the top the chamber to be formed, said cover element being connected via a film hinge 28 to a base element 24 of the end piece 6. As a result, when the base element 24 is latched to the lateral frame part 4, it is subsequently able to form an upper seal of the chamber. Seals 19 are integrally formed on the cover element 17, said seals preferably being butyl-based. During manufacture of the end piece 6 as a plastics injection-molded part, such seals may be integrally formed directly thereon in a two-component injection-molding method. The chamber is open at the front in order to collect water from the water channel 11.

FIG. 3 shows the arrangement consisting of the lateral frame part 4 and end piece 6 after being latched via the snap connections 15 and 16. The water channel 11 is now sealed to the rear. It may also be seen that the stop element 9 adopts a position so that the guide rail 12 is defined to the rear. The stop element is connected via a relatively long arm 25 to the remainder of the base element 24. Due to the resilient properties of the plastics material used, the stop element 9 may be pressed down into a mounting position, so that the arm 25 acts as a spring arm. When the stop element 9 is pressed down, the guide rail 12 is released to the rear so that a sliding roof element may be inserted or pushed out. After pushing the roof element in and/or out, the stop element 9 automatically springs back into its original position, the locked position, in which it defines the guide rail 12 to the rear. The arm 25, by which the stop element 9 is connected to the remainder of the base element 24, is configured to be more rigid in the longitudinal direction of the lateral frame part 4 by means of its geometry, so that the stop element 9 reliably blocks the roof element from being inadvertently moved out. A residual flexibility is present, however, so that the stop element 9 acts in the manner of very flexible rubber when the rearward movement of a sliding roof element is braked. This is advantageous as no noise is produced, as is the case with a hard stop.

The flexibility of the stop element 9 is particularly advantageous as it is possible to reverse the otherwise usual series of mounting steps. Normally, a sliding roof element is initially inserted and then a stop element is mounted. Thus, from the start it has to be established which color the sliding roof element is to have. It is no longer possible to carry out a retrospective replacement in a simple manner. The frame according to the invention, however, may be premounted with the end piece and the sliding roof element may be easily inserted retrospectively. It is also possible to change the roof element later, for example if it is soiled or damaged.

In FIG. 4, the arrangement of FIG. 3 is shown after folding down the cover element 17. The chamber is also now sealed at the top. In FIG. 5, the arrangement of FIG. 4 is shown from the other side. Here it may be seen that the cover element 17 forms a chamber together with the lateral frame part 4 and the base element 24 of the end piece 6. Additionally, the seals 19 which seal the cover element relative to the lateral frame part 4 may be seen. The cover element 17 is held via a latching connection with a clip 18 in the folded down position. In particular, a small degree of pretension is produced between the cover element 17 and the lateral frame part 4. As a result, the relative movement after mounting, which otherwise could negatively influence the seal, is minimized.

In the embodiment according to the invention of an end piece, the seals 19 which are preferably produced as butyl beads are simply pressed together and not subjected to shear forces. As a result, an optimal adhesion of the butyl on the lateral frame part 4 is ensured. Under shear load the butyl would be peeled off and the adhesion between the butyl and the lateral frame part 4 would be very poor.

As a whole, it is advantageous that milling operations which are complex and thus costly are not necessary for machining the lateral frame part. The chamber, which has been formed, reliably prevents leakage in the presence of splashing water. The principle may be used for the most varied profiles of guide rails and frame side parts and is thus able to be used universally.

FIGS. 6 and 7 show sectional views in which the position of the seals may be seen. FIG. 6 shows a cross section through the lateral frame part so that the position of the seal relative to the end piece 6 and to the lateral frame part 4 may be seen. In FIG. 7, a longitudinal section is shown which shows the lower seal. A groove is provided here in the base element of the end piece 6, the seal being located in said groove. The rear edge of the lateral frame part 4 extends into the groove so that a sealed connection is produced between the base element 24 and the lateral frame part 4.

FIG. 8 shows a perspective view in which a sliding roof element 26 may be seen in positions before and after mounting. In particular, it may be seen that a movement out of the guide rails 12 is prevented by the stop elements 9.

Modifications of the disclosed embodiment are naturally possible and encompassed by the invention.

The invention claimed is:

1. A frame of an openable vehicle roof comprising two frame parts extending to the side of a roof opening, said frame parts being defined in each case by an end piece arranged on the rear end of the frame part, wherein a stop element is integrally formed and resiliently mounted on the end piece, said stop element extending in the region between the frame parts.

2. The frame according to claim 1, wherein an arm is integrally formed on a base element of the end piece, the stop element being integrally formed on an other end thereof so that the base element, the arm and the stop element are formed in one piece.

3. The frame according to claim 2, wherein the arm is more rigid in the longitudinal direction of the vehicle than perpendicular to the plane of the roof opening.

4. The frame according to claim 1, wherein in each case the end pieces comprise a base element which is fastened to the lateral frame part and comprise a cover element which is arranged in a mounted position on the lateral frame part such that in each case a chamber is formed at the rear end of the frame part.

5. The frame according to claim 4, wherein at least one seal is arranged between the cover element and the frame part.

6. The frame according to claim 1, wherein at least one seal is located between the rear edge of the frame parts and a contact surface facing said rear edge on the end piece.

7. The frame according to claim 1, wherein the at least one seal is fixedly arranged on the end piece.

8. The frame according to claim 7, wherein during manufacture of the end piece the at least one seal is directly formed thereon as a plastics injection-molded part in a two-component injection-molding method.

9. The frame according to claim 8, wherein the at least one seal consists of a butyl-based material.

10. The frame according to claim 1, wherein in the longitudinal direction of a lateral frame part the end pieces are respectively positioned thereon and are fastened by means of a latching connection.

11. The frame according to claim 1, wherein the lateral side parts comprise channels for discharging water which has penetrated and the end pieces comprise connecting pieces for fastening a water discharge pipe.

12. A method for mounting a frame of an openable vehicle roof, having the following steps in the aforementioned sequence:

fastening an end piece to the rear end of a frame part extending to the side of a roof opening, moving a stop element mounted resiliently on the end piece into a mounting position in which a guide rail of the lateral frame parts is released, inserting a sliding roof element, and moving the stop element into a locked position so that the sliding roof element is secured against moving out of the guide rail.

13. The method according to claim 12, further comprising carrying out the following step, after the end piece has been fastened to the lateral frame part:

positioning a cover element to form a chamber from a lateral frame part, the base element and the cover element.

14. The frame according to claim 2, wherein the arm, to which the stop element is connected to a remainder of the base element, is configured to be more rigid in a longitudinal direction than a downwards direction of the lateral frame part.

15. A frame of an openable vehicle roof comprising two frame parts extending to the side of a roof opening, said frame parts being defined in each case by an end piece arranged on the rear end of the frame part, wherein a resiliently mounted stop element is integrally formed on the end piece, said stop element extending in the region between the frame parts;

wherein in each case the end pieces comprise a base element which is fastened to the lateral frame part and comprise a cover element which is arranged in a mounted position on the lateral frame part such that in each case a chamber is formed at the rear end of the frame part; and wherein the cover element is movably connected to the base element.

16. The frame according to claim 15, wherein the movable connection is provided by a film hinge.

* * * * *